(No Model.) 2 Sheets—Sheet 1.

W. WILLIAMS.
CORN OR POTATO PLANTER.

No. 490,092. Patented Jan. 17, 1893.

WITNESSES:

INVENTOR
William Williams
BY
ATTORNEY.

(No Model.) 2 Sheets—Sheet 2.
W. WILLIAMS.
CORN OR POTATO PLANTER.
No. 490,092. Patented Jan. 17, 1893.
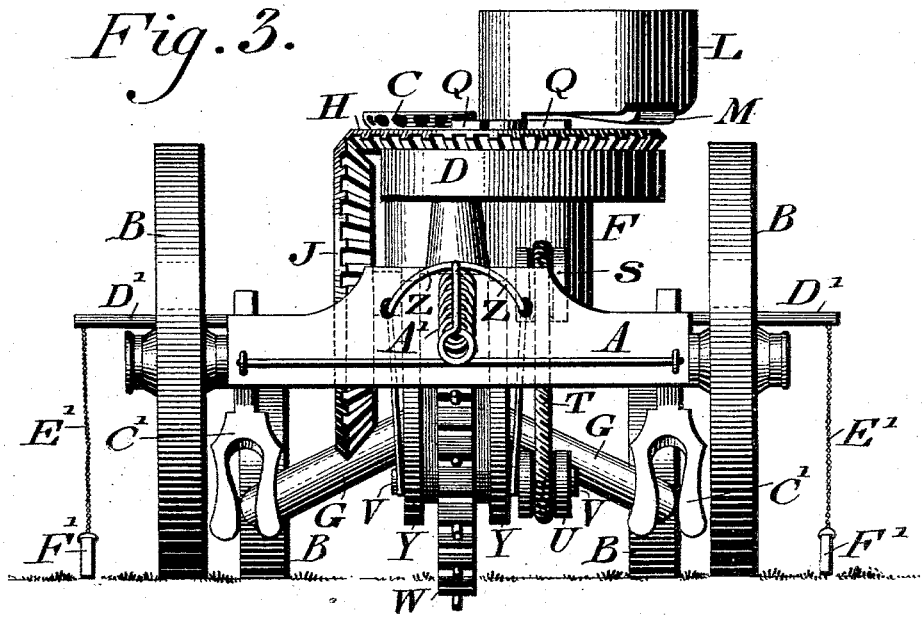
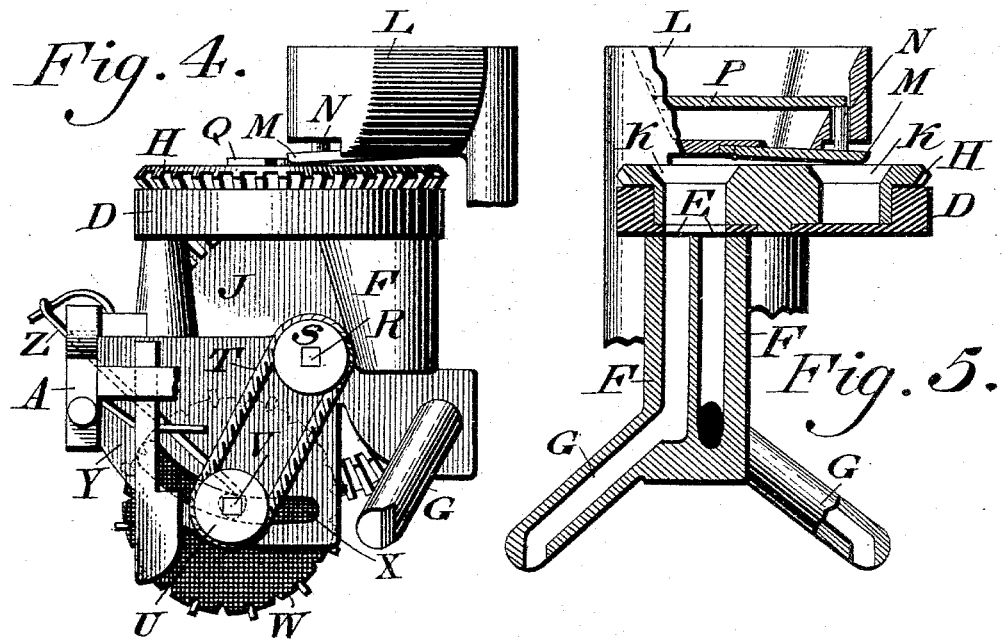
WITNESSES:
O. H. Cagle.
L. Douville.
INVENTOR
William Williams
BY Joshua Piderscheim
ATTORNEY.

UNITED STATES PATENT OFFICE.

WILLIAM WILLIAMS, OF PHILADELPHIA, PENNSYLVANIA, ASSIGNOR OF ONE-HALF TO HALL & GARRISON, OF SAME PLACE.

CORN OR POTATO PLANTER.

SPECIFICATION forming part of Letters Patent No. 490,092, dated January 17, 1893.

Application filed October 13, 1892. Serial No. 448,736. (No model.)

*To all whom it may concern:*

Be it known that I, WILLIAM WILLIAMS, a citizen of the United States, residing in the city and county of Philadelphia, State of Pennsylvania, have invented a new and useful Improvement in Planters for Potatoes, Corn, &c., which improvement is fully set forth in the following specification and accompanying drawings.

My invention consists of a planter provided with a hopper which properly supplies potatoes, corn, &c., to a wheel, which latter carries the same to chutes, whereby said seed may be regularly dropped to the ground.

It also consists of means for relieving the driving wheel of strain in the event of striking obstructions, said wheel automatically returning to its normal position.

It also consists of a marker of novel construction.

Figure 1:
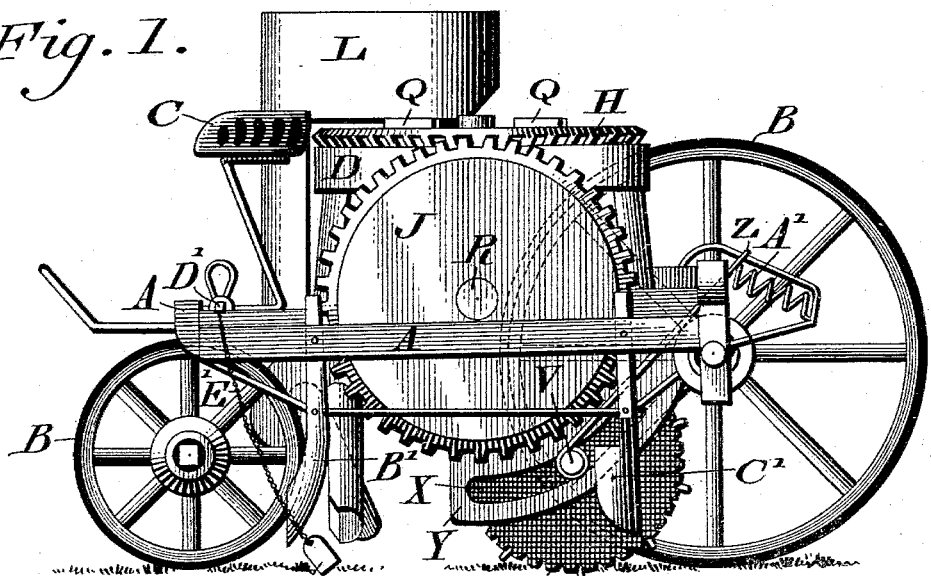
Figure 2:
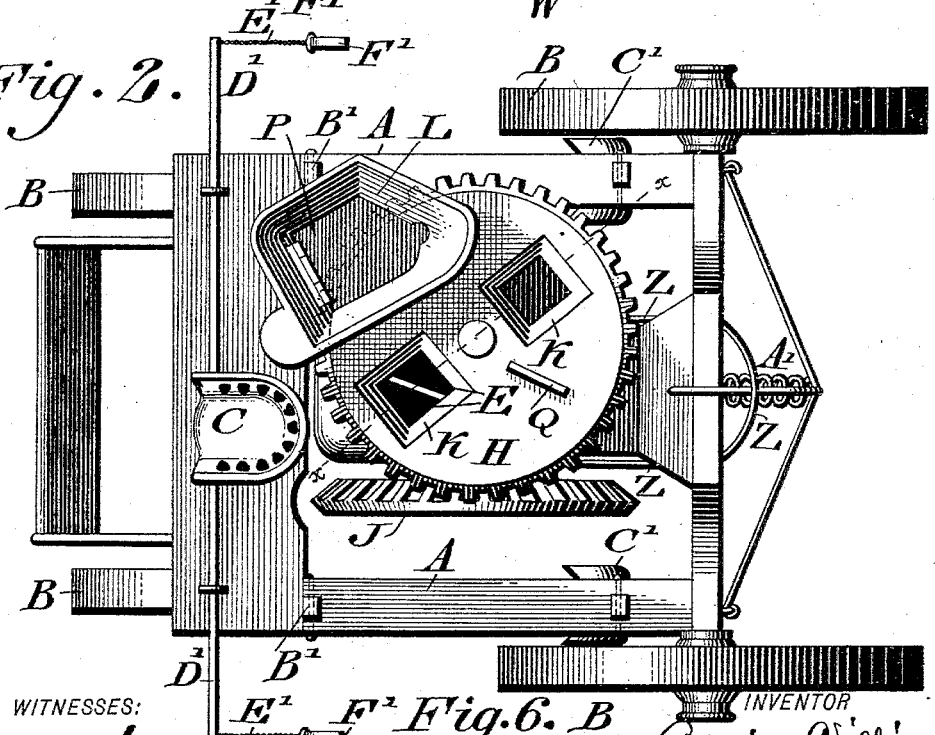
Figure 6:
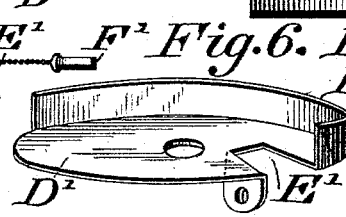

Figure 1 represents a side elevation of a planter embodying my invention. Fig. 2 represents a top or plan view thereof. Fig. 3 represents a rear view thereof. Fig. 4 represents a side view of a portion opposite to Fig. 1. Fig. 5 represents an irregular vertical section of a portion on line x, x, Fig. 2, and Fig. 6 represents a perspective view of a form of guard that may be used for the gearing.

Similar letters of reference indicate corresponding parts in the several figures.

Referring to the drawings:—A designates the frame of the planter, the same being mounted on the wheels B, and provided with a driver's seat C. Supported on the frame A, is a table D, which is provided with openings E with which communicate the chutes F, the lower branches G of which, having their openings above the ground, so as to direct potatoes, corn, &c., to be planted thereto. Supported on the table D, is a toothed wheel H, which meshes with a toothed wheel J, and is provided with vertical openings or pockets K, which when said wheel H is rotated, may be placed at intervals into registry with the openings E. Above the wheel H is a hopper L, at the base whereof is a shoe M, to which is secured the stem N, the latter passing vertically through the hopper, and being adapted to engage with a flap P, which is hinged to the hopper, and located within the same, and adapted to be raised and lowered by the operation of said stem N. On the upper face of the wheel H are projections or risers Q, which engage at intervals with the shoe M, and thus serve to raise the same, said shoe afterward dropping when clear of said projections. The shaft R of the wheel J carries a pulley S, around which passes a belt T which also passes around a pulley U, on whose shaft V is the driving wheel W, the latter being adapted to contact with the ground, and thus receive motion, whereby power may be communicated to the wheel J, and consequently to the wheel H.

The shaft V is supported in segmental slots X in the arms or hangers Y on the frame A. Connected with said shaft V is a U-shaped or bent arm Z, which is guided in the rear cross piece of the frame A, and has bearing against or secured to it a spring A', which is properly sustained on the frame A, the tendency of which is to retain the shaft V in its normal position. Should, however, the wheel W meet with obstruction, it will yield, owing to the slots X in which its shaft is mounted, without however, stopping the operation of the wheel H, the pulley U preserving its radial position to the pulley S. When however, the obstruction is passed, the spring A' will turn said wheel W to its normal position, it being evident that by this provision, said driving wheel is prevented from being broken or straining or otherwise injuring the frame.

B' designates a furrower, and C' the covers of the device.

The operation is as follows:—The hopper is properly supplied with seed to be planted, and the device drawn forward, whereby owing to the wheel W, motion is communicated to the wheel H. When the projections Q strike the shoe M, they raise the same, and as the stem is connected with said shoe, it is also raised, whereby the flap P is lifted. Then when the shoe clears said projections, it drops, and the flap is accordingly lowered. Now as said flap rises and lowers, it agitates the material in the hopper and permits a quantity of the same to pass under the flap and drop through the shoe upon the wheel H and into one of the pockets K, when the latter reaches the opening in said shoe. The seed is now carried around on the table D until it reaches the top of the chutes F, when it is delivered thereinto and drops through the same, reaching the branches G, by which it is delivered to the ground and so planted, the operation being uniform and accomplished at regular intervals. At the forward end of the frame A is a horizontally arranged sliding rod D', from the ends of which depend by means of chains or cords E', the weights F', for marking the ground, it being evident that the rod may be moved to adjust the weights to the position desired for marking, and that when marking is not required, the weights may be raised and placed on the frame.

In Fig. 6, I show a guard for the wheel H, the base D' of said guard being a substitute for the table D, said base having an opening or throat E' through which the material drops into the chute F. On the side of the base there rises a flange D², which encircles the teeth of the wheel H, and thus prevents contact of the hand therewith.

Having thus described my invention, what I claim as new, and desire to secure by Letters Patent, is:—

1. A planter having a hopper with a rising and falling flap therein, and a shoe at the bottom, a stem on said shoe for engagement with said flap, and means for raising and lowering said shoe, substantially as described.

2. A planter having a pocketed wheel, a table with a chute below the same, projections on said wheel, and means for rotating said wheel, a hopper above said wheel, a flap in said hopper, a shoe at the base of the hopper adapted to be engaged at intervals by said projections, and a stem which is connected with said shoe and adapted to engage said flap, the parts named being combined substantially as described.

3. A planter having a pocketed wheel, and a chute adapted to be placed in communication with the pockets thereof, a gear wheel for operating said pocketed wheel, a driving wheel and an intermediate belt and pulley for operating said gear wheel, said driving wheel being mounted on yielding bearings on the frame of the planter, substantially as described.

4. A planter having a frame, a table with openings therein, chutes leading from said openings, a rotary wheel with openings adapted to register with said table openings, a hopper with a flap thereon, and mechanism connected with said hopper and wheel for operating said flap, said parts being combined substantially as described.

5. A planter having a frame, a seed discharging mechanism mounted thereon, including a wheel and shaft, a pulley on said shaft, vertical hangers connected with said frame and having segmental slots therein, a driving wheel mounted on a shaft journaled in said slots and connected by a pulley and belt with said first-mentioned pulley and spring-pressed arm connected with the shaft of said wheel and working in the cross bar of the frame, said parts being combined substantially as described.

WILLIAM WILLIAMS.

Witnesses:
JOHN A. WIEDERSHEIM,
R. H. GRAESER.